United States Patent
Codilian et al.

(10) Patent No.: US 6,897,393 B1
(45) Date of Patent: May 24, 2005

(54) METHODS FOR REDUCING COSTS AND INCREASING THROUGHPUT IN THE MANUFACTURE OF DISK DRIVES BY CATEGORIZING THE DISK DRIVES BASED UPON MEASURED DISK PACK IMBALANCE

(75) Inventors: Raffi Codilian, Irvine, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 102 days.

(21) Appl. No.: 10/136,716

(22) Filed: Apr. 30, 2002

(51) Int. Cl.[7] .............................................. B07C 5/344
(52) U.S. Cl. ...................................... 209/571; 209/573
(58) Field of Search ................................ 209/571, 573; 73/468, 469; 29/603.03

(56) References Cited

U.S. PATENT DOCUMENTS

| | | | | |
|---|---|---|---|---|
| 3,817,088 A | * | 6/1974 | Herbig | .......................... 73/66 |
| 4,683,505 A | * | 7/1987 | Schmidt et al. | .......... 360/98.08 |
| 5,422,776 A | * | 6/1995 | Thorson et al. | .......... 360/98.07 |
| 5,824,898 A | * | 10/1998 | Brooks et al. | ................. 73/469 |
| 6,049,969 A | * | 4/2000 | Jenkins et al. | ................. 29/737 |
| 6,101,876 A | | 8/2000 | Brooks et al. | |
| 6,550,328 B1 | * | 4/2003 | Horning et al. | ................ 73/468 |
| 2004/0088074 A1 | * | 5/2004 | Chen et al. | ................. 700/223 |

* cited by examiner

*Primary Examiner*—Donald P. Walsh
*Assistant Examiner*—Joseph Rodriguez
(74) *Attorney, Agent, or Firm*—Won Tae C. Kim, Esq.; Young Law Firm

(57) ABSTRACT

A method of manufacturing disk drives that are subject to disk pack imbalance includes steps of measuring the disk pack imbalance of each drive and assigning each of the drives to one of a predetermined plurality of categories, depending upon the measured disk pack imbalance. The measured imbalance of the disk drives assigned to fewer than the predetermined plurality of categories may then be reduced. Each category may be associated with one or more customers and the drives assigned to each category may be shipped to the associated customer(s).

12 Claims, 2 Drawing Sheets

METHODS FOR REDUCING COSTS AND INCREASING THROUGHPUT IN THE MANUFACTURE OF DISK DRIVES BY CATEGORIZING THE DISK DRIVES BASED UPON MEASURED DISK PACK IMBALANCE

BACKGROUND OF THE INVENTION

1. Field of the Invention

The present invention relates to disk drives. More particularly, the present invention relates to methods for manufacturing disk drives.

2. Description of the Prior Art

Hard disk drive storage devices have been used as a secondary storage device for computer systems for many years. They provide inexpensive, high capacity digital storage with the ability to quickly access data stored on the drive. A typical hard disk drive comprises a housing with one or more magnetic disks separated by spacers mounted on a motor driven spindle hub that in turn is supported on a base. Data is stored on the disks by changing the magnetization of small areas on the disks called domains. The domains are written and read by magnetic transducers mounted on the end of suspensions that are coupled to a rotary actuator positioned to one side of the disks. The rotary actuator moves the transducers radially over the surfaces of the disks. Data on the disks are written in substantially parallel concentric tracks, with information, called servo information designed to be detected by the transducers and used to control the radial position of the transducer so that it can move across tracks of data and follow a track of data.

It is crucial that the disk pack is balanced so that it does not cause significant vibration of the disk drive when the drive is rotated at high speed. A disk pack typically includes a spindle motor, at least one disk, a disk spacer between a pair of disks and a disk clamp. Typical disks rotate at between 5400 to 15,000 revolutions per minute (RPM) and higher. An out of balance condition in the rotating disk pack causes erratic speed variations with respect to the tracks and heads that results in read/write errors. Planar and axial vibrations of the disk surfaces can also contribute to head crashes, harming both the disk surface and the head. Disks that significantly vibrate when rotating also increase track misregistration, cause annoying acoustical emissions (noise) when the disk drive is mounted in a customer chassis, such as a computer chassis and a reduction in the life of spindle bearings. When such disk drives are used in an array of disk drives, the mechanical vibrations of the multiple drives can become synchronized, resulting in unacceptable vibration of the entire array. There is a need, therefore, to ensure that the disks are centered when clamping them to the spindle hub to avoid these problems.

To correct or improve such imbalances, among other methods of balancing disk packs, commonly assigned U.S. Pat. No. 5,824,898 (incorporated herein by reference) proposes to reduce the amplitude of rotational vibration of a disk pack in a disk drive by imparting acceleration to a support thereof to shift it as a function of measured rotational vibration. According to one embodiment described in this patent, as the motor rotates the hub and disk stack, a sensor detects vibrations of the base caused by the disk pack imbalance. A momentum transferring force is then applied to the base, causing the disk stack to shift relative to the base in a manner designed to reduce the imbalance and hence the induced vibrations. Multiple instances of momentum imparting force may be applied until the vibrations are within a predetermined value.

By shifting the entire disk stack in unison through the application of the momentum imparting force, the disks may become substantially and concentrically aligned relative to one other following the balancing. In addition, the inherent vibrations that cause the rotational imbalance in the motor and hub combination are offset by a substantially equal and opposite imbalance in the disk stack. Reducing the disk pack imbalance in this manner also beneficially reduces acoustical noise.

As suggested by FIG. 1, a number of disk drive manufacturing steps are carried out, including coupling the disk pack to the base. Thereafter, the disk pack imbalance of each drive is measured (for example, by rotating the disk pack and measuring the disk pack imbalance while the disks are rotated). Following the disk pack imbalance-measuring step, each of the measured disk drives conventionally undergoes a balancing step, followed by subsequent manufacturing steps, including servo writing, for example. Conventionally, each disk drive passes through a disk pack balancing station, irrespective of whether the measured imbalance is within an acceptable range or not. During the balancing process, the disk pack imbalance of each drive is iteratively measured, corrected and verified. Routing each of the disk drives through such a disk pack balancing station or stations and/or subjecting each drive to such balance reducing steps is costly in terms of manufacturing costs, but also in terms of throughput of the entire manufacturing assembly line. Indeed, it may take as much as 20 to 50 seconds per drive to measure the disk pack imbalance of the drive, reduce the measured imbalance and verify the resulting balance of the disk pack of the drive. Conventionally, one way to reduce the costs associated with such a balancing process was to route the drives through a number of balancing stations in parallel. However, this solution is less than optimal, as it merely functions to reduce the width of the bottleneck through which each drive must pass and geometrically increases the disk pack balancing costs, as several disk pack imbalance reducing machines must be purchased, installed, run and maintained.

What are needed, therefore, are methods of manufacturing disk drives that reduce the costs associated with reducing disk pack imbalance and that increase the manufacturing throughput.

SUMMARY OF THE INVENTION

This invention may be regarded as a method of manufacturing a plurality of disk drives, each of the plurality of disk drives being subject to disk pack imbalance, including the steps of measuring a disk pack imbalance of each of the plurality of disk drives, and assigning each of the plurality of disk drives to one of a predetermined plurality of categories depending upon the measured disk pack imbalance.

The method may further include a step of reducing the measured disk pack imbalance on the disk drives assigned to fewer than the predetermined plurality of categories. Each category of the predetermined plurality of categories may be associated with one or more customers and the method may further include a step of shipping the disk drives assigned to each category to the associated customer(s).

According to another embodiment thereof, the present invention is also a method of manufacturing a plurality of disk drives, each of the plurality of disk drives being subject to disk pack imbalance, the method including steps of measuring the disk pack imbalance of each of the plurality of disk drives; associating indicia with each of the plurality of disk drives, the indicia being indicative of the measured disk pack imbalance and assigning each of the disk drives to one of a predetermined plurality of categories depending upon the associated indicia.

A step of shipping the disk drives to a selected customer depending upon the associated indicia may also be carried out. The indicia may be or include the value of the measured disk pack imbalance and the method may further include storing the value of the measured disk pack imbalance. The indicia may be, for example, machine-readable and attached to each of the plurality of disk drives. A step of reducing the measured disk pack imbalance on the disk drives assigned to fewer than the predetermined plurality of categories (i.e., none of the categories, one of the categories or more than one but less than all categories) may also be carried out. A step of diverting the disk drives assigned to one or more of the categories away from a station where the measured disk pack imbalance is reduced may also be carried out. Alternatively, a step of diverting disk drives assigned to at least one of the predetermined plurality of categories to a station where the measured disk pack imbalance is reduced may be carried out.

The foregoing and other features of the invention are described in detail below and set forth in the appended claims.

DESCRIPTION OF THE PREFERRED EMBODIMENTS

Figure 1:
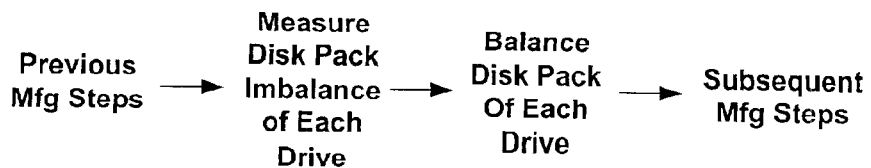
FIG. 1 is a flowchart illustrating certain disk drive manufacturing steps, according to the prior art.
Figure 2:
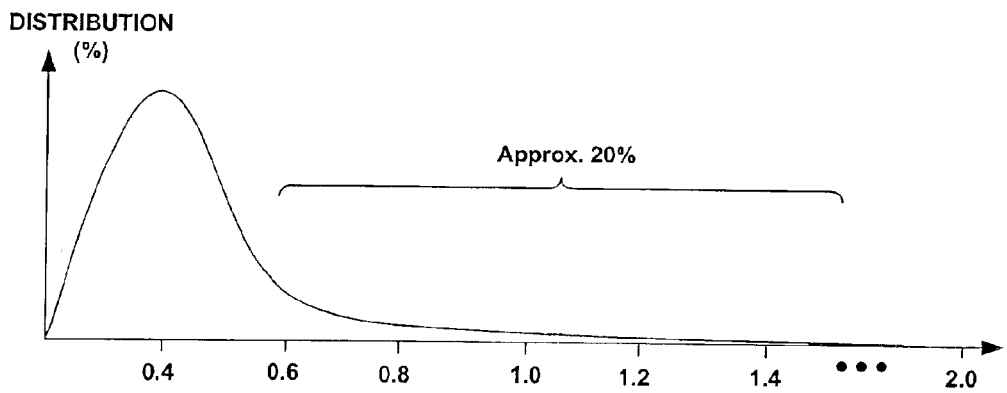
FIG. 2 shows a typical distribution of disk pack imbalances, expressed as percentage of total drives versus measured disk pack imbalance, expressed in grams-millimeter.

FIG. 2 shows a representative distribution of measured disk pack imbalance values, expressed as percentage of total drives versus measured disk pack imbalance, in grams-millimeter. As shown in the exemplary (and non limiting) distribution of FIG. 2, current manufacturing techniques are such that the majority of drives exhibit have a disk pack imbalance that is 0.6 grams-millimeter or less. The acceptable range for measured values of disk pack imbalance may vary according to the platform in which the drives are to be incorporated. For example, disk drives that are to be incorporated in a disk array (such as a Redundant Array of Independent Disks-RAID) often have more stringent disk pack imbalance requirements than drives that are destined to be incorporated in personal computers for the mass consumer market, for example, in which some greater imbalance and thus vibration may be acceptable. Alternatively, corporate customers themselves may specify an acceptable range for the disk pack imbalance of drives they purchase from a disk drive maker. With reference to FIG. 2, if the maximum acceptable disk pack imbalance is 0.4 grams-millimeter for one customer and 0.6 grams-millimeter for another customer, then the vast majority (approximately 80% in this example) of the drives do not require any disk pack balancing. Therefore, subjecting the drives that exhibit disk pack imbalances that fall within one or more acceptable ranges is unnecessary, wasteful of resources and detrimentally affects the throughput of the line and increases the cost of the drives. The present invention, therefore, includes methods whereby only those disk drives whose measured disk pack imbalance values fall outside acceptable ranges are subjected to disk pack imbalance reducing steps.

Figure 3:
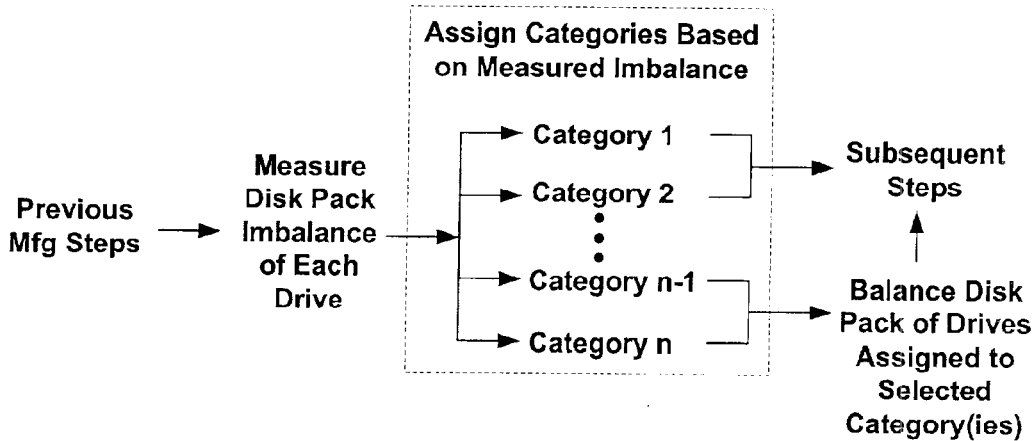
FIG. 3 is a flowchart illustrating certain disk drive manufacturing steps, according to an embodiment of the present invention.

FIG. 3 is a flowchart illustrating certain disk drive manufacturing steps, according to further embodiments of the present invention. As shown in FIG. 3, the disk drives may be manufactured as in the prior art, up to and including the measurement of the disk pack imbalance of each drive. According to the present invention, however, after the disk pack imbalance-measuring step, each of the drives may be assigned to one of a predetermined plurality of categories based upon the measured disk pack imbalance value. For example, the predetermined plurality of categories may include 4 categories, referenced by Category 1, Category 2, Category 3 and Category 4, although the present invention envisages the assignment of disk drives to a greater or lesser number of categories.

According to an embodiment of the present invention, the measured disk pack imbalance of the drives assigned to only some of the categories may be reduced (reduced in the manner disclosed in the above-cited patent, for example). For example, as shown in FIG. 3, the disk drives assigned to Category 3 (corresponding to Category n−1 in FIG. 3) and Category 4 (corresponding to Category n in FIG. 3) may be subjected to a disk pack imbalance-reducing step or steps. Disk drives assigned to Categories 1 and 2, however, need not be subjected to a step or steps to reduce their respective measured disk pack imbalances, as the measured values for the disk pack imbalance fall within an acceptable range or ranges, whether such range is specified by the disk drive maker and/or a customer thereof. Rather than indiscriminately subjecting each disk drive to a step or steps to reduce the measured disk pack imbalance (or merely running such drives through a disk pack imbalance reducing station), the present invention contemplates that only disk drives assigned to selected categories be subjected to such disk pack imbalance reducing step or steps.

Continuing with the example introduced above and according to FIG. 3, drives assigned to Categories 1 and 2 may then bypass the disk pack imbalance-reducing step, steps and/or station and proceed directly to the next manufacturing steps, such as the servo write (and/or other) steps, for example. According to the present invention, therefore, only a small percentage of the manufactured drives need to run through an imbalance reducing station and/or subjected to imbalance reducing step or steps. As a result, for the majority of drives that do not require such imbalance reducing steps, the number of manufacturing steps are reduced, which enables the drives to be manufactured in a more timely and cost effective (and thus competitive) manner. According to the present invention, therefore, each of the categories to which disk drives may be assigned are associated with a predetermined range of disk pack imbalance values. For example, Categories 1 and 2 in the example developed herein may be associated, for example, with a range of disk pack imbalance of up to 0.4 grams-millimeter and up to 0.6 grams-millimeter, respectively. By virtue of such categorization, the disk drive maker may be able to ship Category 1 drives (disk drives assigned to Category 1) to a first selected customer or customers and ship Category 2 drives to a second selected customer or customers without incurring the extra expense of reducing the disk pack imbalance of these drives.

Figure 4:
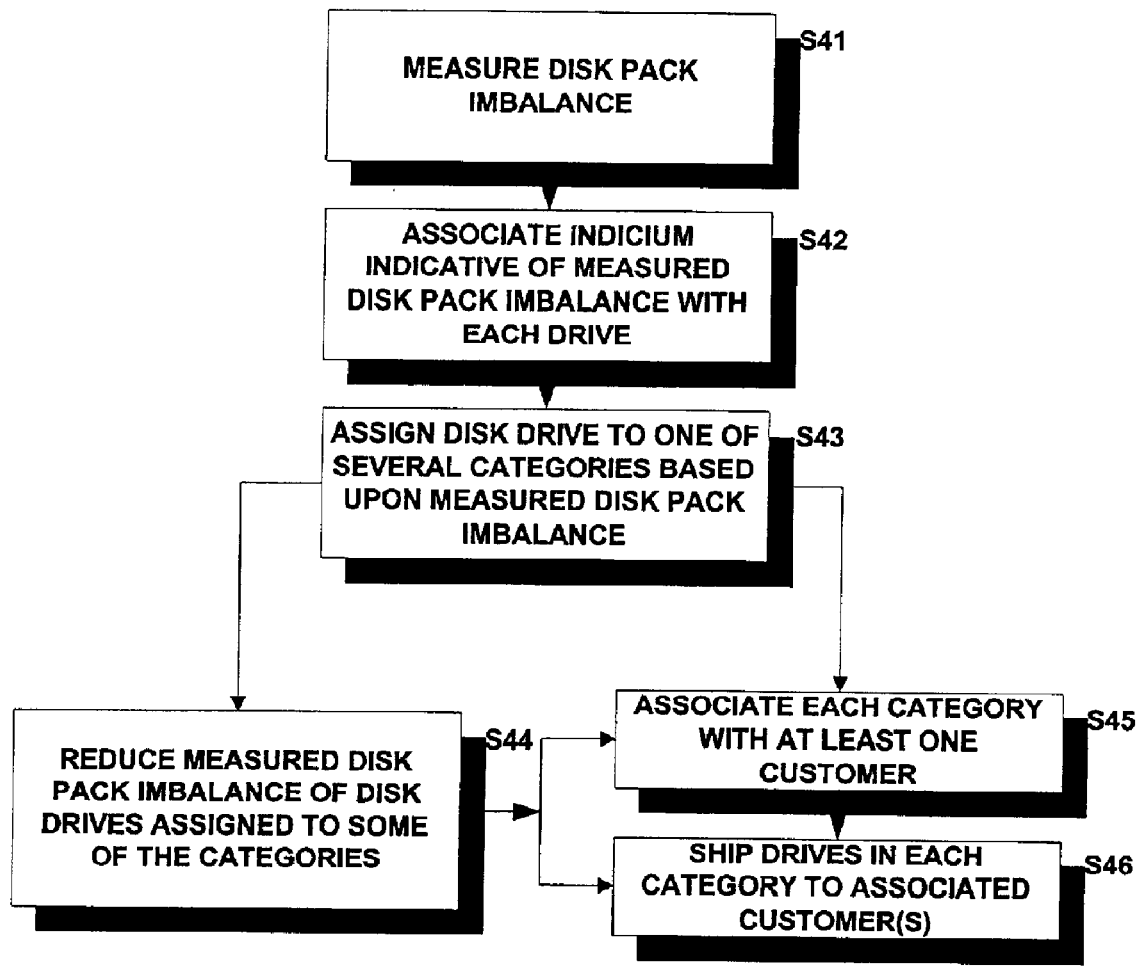
FIG. 4 is another flowchart illustrating other aspects and embodiments of the present invention.

FIG. 4 is a flowchart illustrating further aspects and embodiments of the present invention. As shown in step S41, the disk pack imbalance of each of the plurality of disk drives is measured. Thereafter, step S42 may be carried out, in which indicia (or a single indicium) indicative of the measured disk pack imbalance is associated with each drive. Such indicia may be a value corresponding to the measured disk pack imbalance that is stored in a computer readable memory, a machine-readable code applied or otherwise affixed to the drive or any other mark that distinguishes each of the predetermined number of categories from all other categories. The indicia may also uniquely identify the particular drive to which it is associated and/or affixed. Thereafter, as shown at S43, each of the drives may be assigned to one of a predetermined number of categories depending upon the associated indicia.

Thereafter, the disk drives associated with one or more (but not all) of the predetermined number of categories may be routed to a disk pack imbalance reducing station and/or otherwise subjected to steps tending to reduce the measured disk pack imbalance thereof, as shown at S44. Instead of or in addition to step S44, each category may be associated with one or more customers (and/or a selected market segment or segments, for example), as shown at S45. As shown at S46, after all manufacturing and quality assurance steps have been carried out, the drives may be shipped to the customers associated with each category or associated with each indicia. Steps S45 and S46 may be carried out after the disk pack imbalance reducing step of S44 or may advantageously bypass such step S44, depending upon the measured disk pack imbalance.

Advantageously, a method is provided herein for reducing the measured disk pack imbalance on the disk drives assigned to fewer than the predetermined plurality of categories (i.e., none of the categories, one of the categories or some but not all of the predetermined number of categories). The indicia or indicium affixed or associated with each drive allows disk drives not requiring disk pack imbalance reducing steps to be either physically diverted from the path taken by the drives that do, in fact, require such imbalance reducing steps or allows those drives that do not require disk pack reducing steps to be passed straight through the imbalance reducing station(s) with the minimum of delay and adverse effects upon the overall throughput of the manufacturing line. The imbalance ranges associated with each of the predetermined number of categories may be changed at will, as may be the predetermined number of categories itself. This allows a flexible and potentially dynamic categorization of the drives based upon measured disk pack imbalance, for whatever purpose the disk drive maker chooses.

What is claimed is:

1. A method of manufacturing a plurality of disk drives, each of the plurality of disk drives being subject to disk pack imbalance, comprising:

measuring a disk pack imbalance of each of the plurality of disk drives;

assigning each of the plurality of disk drives to one of a predetermined plurality of categories depending upon the measured disk pack imbalance, each category of the predetermined plurality of categories being associated with at least one customer and being defined by a maximum disk imbalance that is acceptable to the at least one customer to which the category is associated;

reducing the measured disk pack imbalance on the disk drives assigned to only some of the predetermined plurality of categories, and shipping the disk drives assigned to each category to the at least one associated customer.

2. A method of manufacturing a plurality of disk drives, each of the plurality of disk drives being subject to disk pack imbalance, comprising:

measuring the disk pack imbalance of each of the plurality of disk drives;

associating indicia with each of the plurality of disk drives, the indicia being indicative of the measured disk pack imbalance; and assigning each of the plurality of disk drives to one of a predetermined plurality of categories depending upon the associated indicia, each category of the predetermined plurality of categories being associated with at least one customer and being defined by a maximum disk imbalance that is acceptable to the at least one customer to which the category is associated;

reducing the measured disk pack imbalance on the disk drives assigned to only some of the predetermined plurality of categories, and shipping the disk drives assigned to each category to the at least one associated customer.

3. The method of claim, 2 wherein the indicia includes a value of the measured disk pack imbalance and wherein the method further comprises storing the value of the measured disk pack imbalance.

4. The method of claim 2, wherein the indicia is machine-readable and attached to each of the plurality of disk drives.

5. The method of claim 2, further comprising diverting disk drives assigned to at least one of the predetermined plurality of categories away from a station where the measured disk pack imbalance is reduced.

6. The method of claim 2, further comprising diverting disk drives assigned to at least one of the predetermined plurality of categories to a station where the measured disk pack imbalance is reduced.

7. A method of manufacturing a plurality of disk drives, each of the plurality of disk drives being subject to disk pack imbalance, comprising:

measuring a disk pack imbalance of each of the plurality of disk drives;

assigning each of the plurality of disk drives to one of a predetermined plurality of categories depending upon the measured disk pack imbalance, each category of the predetermined plurality of categories being associated with at least one customer and being defined by a maximum disk imbalance that is acceptable to the at least one customer to which the category is associated, and shipping the disk drives assigned to each category to the at least one associated customer.

8. A method of manufacturing a plurality of disk drives, each of the plurality of disk drives being subject to disk pack imbalance, comprising:

measuring the disk pack imbalance of each of the plurality of disk drives;

associating indicia with each of the plurality of disk drives, the indicia being indicative of the measured disk pack imbalance; and assigning each of the plurality of disk drives to one of a predetermined plurality of categories depending upon the associated indicia, each category of the predetermined plurality of categories being associated with at least one customer and being defined by a maximum disk imbalance that is acceptable to the at least one customer to which the category is associated, and shipping the disk drives assigned to each category to the at least one associated customer.

9. The method of claim 8, wherein the indicia includes a value of the measured disk pack imbalance and wherein the method further comprises storing the value of the measured disk pack imbalance.

10. The method of claim 8, wherein the indicia is machine-readable and attached to each plurality of disk drives.

11. The method of claim 8, further comprising diverting disk drives assigned to at least one of the predetermined plurality of categories away from a station where the measured disk pack imbalance is reduced.

12. The method of claim 8, further comprising diverting disk drives assigned to at least one of the predetermined plurality of categories to a station where the measured disk pack imbalance is reduced.

* * * * *